(12) United States Patent
Travagline et al.

(10) Patent No.: US 6,577,988 B1
(45) Date of Patent: Jun. 10, 2003

(54) METHOD AND SYSTEM FOR REMOTE GAS MONITORING

(75) Inventors: David Louis Travagline, Wappingers Falls, NY (US); John E. Wacker, Jr., Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 09/634,315

(22) Filed: Aug. 8, 2000

(51) Int. Cl.$^7$ .......................... G06F 11/30; G05B 23/02
(52) U.S. Cl. ...................... 702/188; 702/184; 340/3.1; 340/5.9
(58) Field of Search ................ 702/22, 24, 30–33, 702/45, 122, 182, 184, 185, 187, 188; 700/99, 266, 275; 340/3.1, 3.5, 5.9, 5.92, 7.29, 825.29; 707/9

(56) References Cited

U.S. PATENT DOCUMENTS

| | | | |
|---|---|---|---|
| 4,088,985 A | 5/1978 | Saito et al. ................. 340/605 |
| 4,383,298 A * | 5/1983 | Huff et al. ..................... 705/1 |
| 4,464,653 A | 8/1984 | Winner ....................... 340/501 |
| 4,520,265 A | 5/1985 | Griggs et al. ............ 250/338.5 |
| 4,749,992 A | 6/1988 | Fitzemeyer et al. ... 340/870.02 |
| 4,866,594 A * | 9/1989 | David et al. ............... 340/3.44 |
| 5,126,729 A | 6/1992 | McKinney et al. ......... 340/450 |
| 5,220,517 A * | 6/1993 | Sierk et al. .................. 340/3.1 |
| 5,265,031 A * | 11/1993 | Malczewski ................ 702/24 |
| 5,265,032 A | 11/1993 | Patel ........................... 702/188 |
| 5,497,316 A * | 3/1996 | Sierk et al. ................... 700/11 |
| 5,511,415 A | 4/1996 | Nair et al. ................ 73/204.11 |
| 5,553,006 A | 9/1996 | Benda ......................... 700/276 |
| 5,586,050 A | 12/1996 | Makel et al. ................. 702/51 |
| 5,644,711 A * | 7/1997 | Murphy .......................... 707/9 |
| 5,717,718 A | 2/1998 | Rowsell et al. ............. 375/260 |
| 5,757,659 A | 5/1998 | Arai et al. ..................... 702/22 |
| 5,790,977 A * | 8/1998 | Ezekiel ........................ 702/122 |
| 5,953,682 A | 9/1999 | McCarrick et al. ........... 702/45 |
| 5,966,683 A | 10/1999 | Millett et al. ............... 702/179 |
| 5,970,149 A | 10/1999 | Johnson ........................ 714/46 |
| 6,205,480 B1 * | 3/2001 | Broadhurst et al. ........... 707/10 |
| 6,303,395 B1 * | 10/2001 | Nulman ....................... 438/14 |
| 6,314,385 B1 * | 11/2001 | Kim et al. ................... 700/108 |
| 6,377,171 B1 * | 4/2002 | Fewel ......................... 340/522 |
| 6,411,678 B1 * | 6/2002 | Tomlinson et al. ........ 379/1.01 |
| 6,437,692 B1 * | 8/2002 | Petite et al. ................. 340/3.1 |

\* cited by examiner

*Primary Examiner*—Marc S. Hoff
*Assistant Examiner*—Manuel L. Barbee
(74) *Attorney, Agent, or Firm*—Todd M. C. Li

(57) ABSTRACT

A monitoring system is described for monitoring gas delivery systems from a Web browser. The system collects data generated from existing gas delivery systems, as well as other information, such as maintenance and repair data, and stores the data in a database located on a centralized server computer system. An authorized user may access the database from a remote location, check the status of the gas cylinders, manifolds, and tools, and generate reports including mean-time-to-failure reports, serviceability, comparisons among buildings or sites, thus saving time and helping to minimize future downtime of the gas delivery system. In addition, the monitoring system automatically monitors the gas delivery system for critical conditions and automatically notifies appropriate personnel of conditions that require immediate attention.

12 Claims, 7 Drawing Sheets

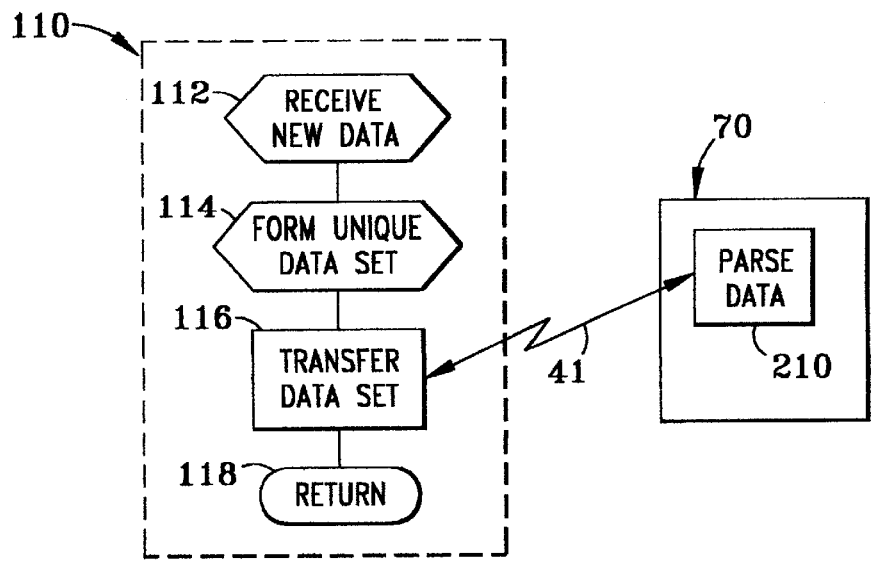
FIG. 4
FIG. 5
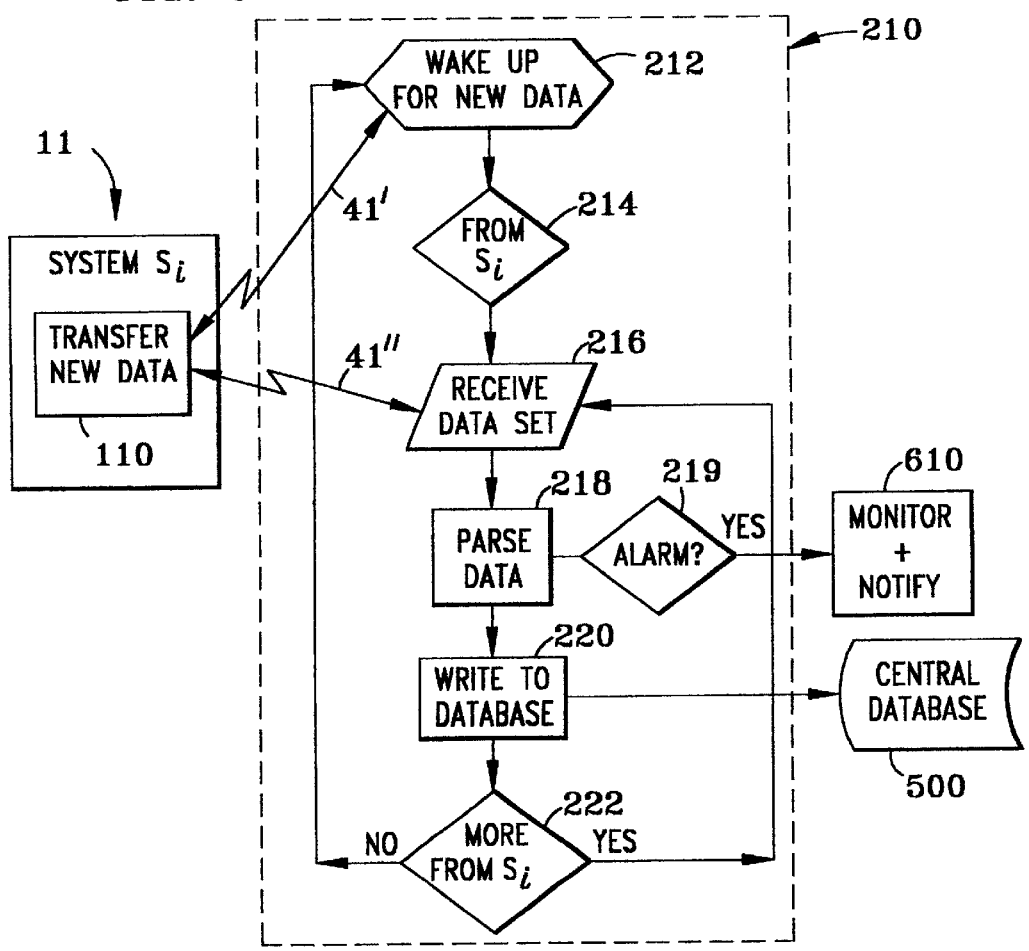

METHOD AND SYSTEM FOR REMOTE GAS MONITORING

FIELD OF THE INVENTION

The present invention relates to monitoring systems and more particularly to a method and system for monitoring gases used in semiconductor manufacturing at one or more sites from a remote location using the World Wide Web. This invention provides increased efficiency in monitoring the gases and results in improved efficiency in identification of alarms, responding to problems and reducing down time.

BACKGROUND OF THE INVENTION

The manufacture of semiconductor devices involves the use of a variety of gases, which typically are toxic. The gases are contained in cylinders which are stored in cabinets. The gases are delivered to the tools during the manufacturing process under the control of a process gas delivery system. An example of a commercially available process gas delivery system is the GASGUARD® Network System from Air Products & Chemicals, Inc. The components of a typical process gas delivery system 50 are illustrated in FIG. 1, which comprises a gas cabinet 14, an optional manifold box 15, a network interface 13, two network adapters (not shown), and control software (not shown) which runs within a personal computer (PC) system 11. There are typically one or two cylinders of gas (not shown) within a gas cabinet 14. The gas cabinet 14 may be connected via gas lines (not shown) to a single tool 30, or preferably, through a manifold box 15. A manifold box 15 can provide a controlled feed of gases to typically as many as four tools 30. If one of the tools 30 requires maintenance, the flow of gases to a given tool may be shut off by using a gas isolation box (GIB) 20 which allows the other remaining tools 30 to remain in production while an individual tool is serviced. The use of a GIB 20 also permits gas pressure to be maintained in the gas line while a tool 30 is being serviced, so that the tool may be brought back on line quickly without having to re-pressurize the gas line. The GIB 20 is not part of the gas delivery system and is considered part of the semiconductor processing equipment.

In a typical semiconductor fabrication operation, a single gas delivery system may include well over a hundred gas cabinets 14 and manifolds 15 which are controlled from a control room 10. Each gas cabinet 14 and manifold 15 is in communications with the control room 10 through a network interface 13. The network interface 13 is in communication with software that is provided as part of the gas delivery system, and the software runs on one or more PC's 11 located within the control room 10. For example, a typical GASGUARD® network may include between one or more PC's 11 connected to a single network interface 13, and each PC 11 is capable of controlling well over a hundred units comprising a combination of gas cabinets 14 and mainfolds 15. The software provides numerous menus and functions to control, operate, and collect data from the gas cabinets 14 and manifolds 15.

In a typical semiconductor fabrication operation, wafer processing proceeds 24 hours a day, 7 days a week. Therefore, reliable delivery of process gases to the process tools 30 is required to maintain continuous production. The gas delivery system is designed to collect information about the status of the gases within the gas delivery system 50 and notify technicians and operators within the control room 10 in the event of any problems that may occur. Examples of problems include gas leaks, high or low pressure, high temperatures, etc. For example, a low pressure reading might indicate that a gas cylinder needs to be replaced. Data collected at regular intervals includes gas pressures and flow rates. Under normal operating conditions, such data need only be recorded infrequently. Because the gas is depleted from the cylinders slowly, pressure data need only be recorded once every 6 hours in a typical operation. However, an alarm condition may require immediate attention by a technician to correct a problem such as a gas leak. Thus, a technician who is required to be physically present in a given control room to monitor the gas delivery system data is largely unproductive, unless and until an alarm is signaled. Such gas delivery systems may be implemented in multiple buildings and at multiple sites across the world within given organization. In addition, the occurrence of conditions requiring the changing of gas cylinders or of alarms is unpredictable. This creates difficulties and inefficiencies in staffing the control room and in effectively tracking the status of gases and equipment across multiple sites.

One related system that provides for a distributed monitor and control system for gases within a building is discussed in U.S. Pat. No. 4,866,594 entitled "Gas Cylinder Monitor and Control System" issued to David et al. on Sep. 12, 1989 (hereinafter referred to as the David patent). The David patent provides for a system to monitor gases within a given building by using distributed monitoring modules connected to a centralized control system that includes means for signaling alarms at distributed locations within the building. An alarm may be communicated automatically to an operator by using a radio pager system. The centralized control system may comprise a computer system that can process data collected from the distributed modules and can generate statistical reports which can be printed out in hard copy form. However, the David patent was not designed to work with multiple sites.

U.S. Pat. No. 5,265,032 entitled "Method for Controlling LP Gas Inventory" issued to Naresh P. Patel oh Nov. 23, 1993 (hereinafter referred to as the Patel patent) discloses a method of collecting information for controlling liquid propane (LP) gas inventory in tanks at multiple remote locations. The Patel patent discusses the use of a computer to collect inventory data from a sensors that indicate LP gas levels within the tanks. The method of communication disclosed is provided by an autodialer and modem using telephone calls to receive and transmit information. The Patel patent discusses the use of the computer to maintain data files, prepare reports, and send reports to a host computer, for the purpose of maintaining LP gas inventories and minimizing trips to refill the LP gas tanks. However, the Patel patent does not address the complexity of equipment and types of gases that must be monitored in a gas delivery system used for processing semiconductors.

Neither the David patent nor the Patel patent provides for access to a centralized database from the Internet, using the service facilities known as the World Wide Web (hereinafter referred to as the Web).

The Internet refers to the network of computers that arose out of the network created by the Advanced Research Projects Agency (ARPA) using the Transmission Control Protocol/Internet protocol (TCP/IP) as the method for providing communication between the computers on the network. A number of service facilities have been developed to access and transfer information across the Internet and one of the most popular is known as the World Wide Web (Web) Typically, a user would access data on the Web by interfacing with software known as a Web browser, running on a client computer that is connected from the Internet.

The capabilities of a Web browser may be enhanced by executing a small program, or applet, running within the environment of the browser. Such an applet may be written in any of a variety of programming languages, such as Java™. Java™, a trademark of Sun Microsystems, Inc., is an object-oriented, platform-independent programming environment. One way that Java™ platform independence is achieved is by embedding the Java™ run-time environment, known as the Java™ virtual machine (JVM), within a Web browser. Java™ programs are compiled in byte format, which may be downloaded from a server and then interpreted by the JVM running within the Web browser. Thus, a program embodied as a Java™ applet has the flexibility of being available from any computer system having a Java™-enabled Web browser and connected to the Internet.

SUMMARY OF THE INVENTION

It is an object of the present invention to allow process gas technicians to quickly and efficiently monitor and detect process gas problems at any manufacturing site or building, from any control room, office, home or any location where the Internet may be accessed, so that technicians do not have to be physically present in the control room where the gas monitoring system is located, and technicians may be employed when and where they are actually needed.

It is another object of the present invention to provide production operators, maintenance technicians, equipment engineers and managers access to information about their production tools to view current gas readings, events, or alarms.

It is another object of the present invention to provide access to information about all the gases throughout a site or across the enterprise so that the process gas services department can better manage and monitor their numerous distributed gas systems.

It is another object of the present invention to provide users with statistics related to the time of equipment failure and repair in order to improve the possibility of preventative maintenance.

It is another object of the present invention to provide users with automated reports and views of numerous process gas and/or tool statistics that are not currently available today or are manually produced today.

According to a preferred embodiment of the present invention, raw data comprising information such as tool pressures, tool status and alarms, gas cabinet events, and historical installation data, and similar data that is generated by a local Process Gas Control System is stored on a local computer system, such as a personal computer (PC).

According to a preferred embodiment of the present invention the local computer system also comprises a program that transfers the stored raw data to a server computer system located on a local area network (LAN). The transfer of data may be performed according to a prescribed schedule.

Also according to a preferred embodiment, the server computer system comprises a parser program that reads and parses the raw data and loads critical data into a database on the server. Commercial database software (for example, DB2® in the preferred embodiment), may be used to create and maintain the database. The database of the present invention may be accessed and queried by means of a secure connection from the Internet.

Also, according to a preferred embodiment of the present invention, the server further comprises an automated notification program that monitors the database according to predetermined warning limits, and if said warning limits are reached or exceeded, the notification program sends out notifications to a person selected from a list of qualified personnel having a notification device. Such a notification device could be a pager device, a Personal Digital Assistant (PDA), a Web enabled cellular device, or any similar device.

The present invention also comprises a program (such as a Java™ application) that provides authorized personnel secure access to the gas process data through the Internet. The access is provided through a Web browser interface from which the authorized user may query any information of interest located in the database on the server computer system. The present invention also allows the user to request a variety of reports to be displayed and formatted within a Web browser frame.

The novel features believed to be characteristic of this invention are set forth in the appended claims. The invention itself, however, as well as other objects and advantages thereof, may be best understood by reference to the following detailed description of an illustrated preferred embodiment to be read in conjunction with the accompanying drawings.

BRIEF DESCRIPTION OF THE DRAWINGS

FIG. 4 shows a flow chart of a data transfer program running on a control room computer system that transfers data from the storage medium on the control room computer to a server computer system.

FIG. 5 shows a flow chart of a data parser program running on a server computer system that receives data from a remote control room computer system, parses the data, and loads the data into a process gas information database on the server computer system.

DESCRIPTION OF THE PREFERRED EMBODIMENTS

Figure 1:
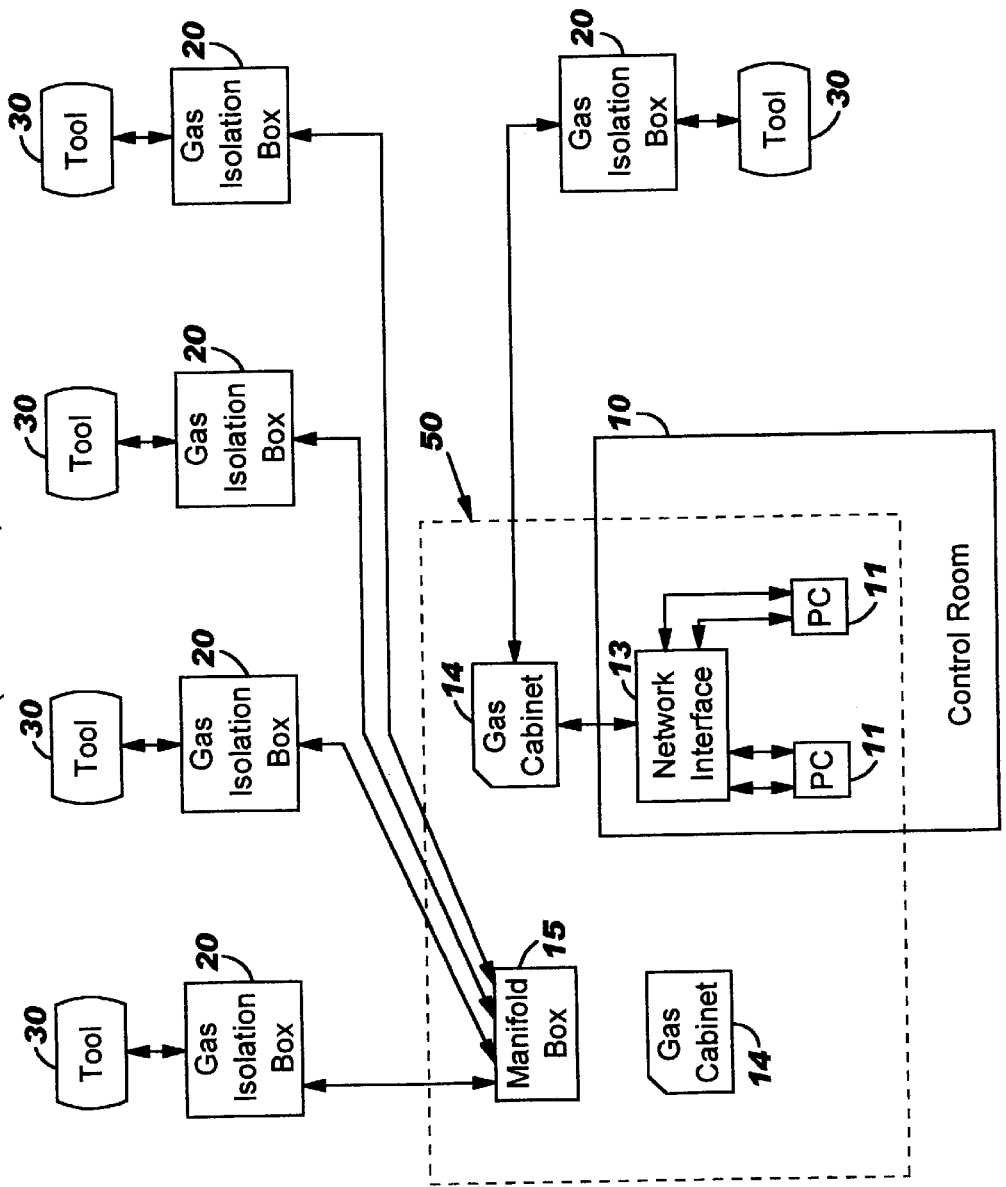
FIG. 1 is a diagram illustrating a prior art process gas delivery system in relation to tools used in semiconductor manufacturing.
Figure 2:
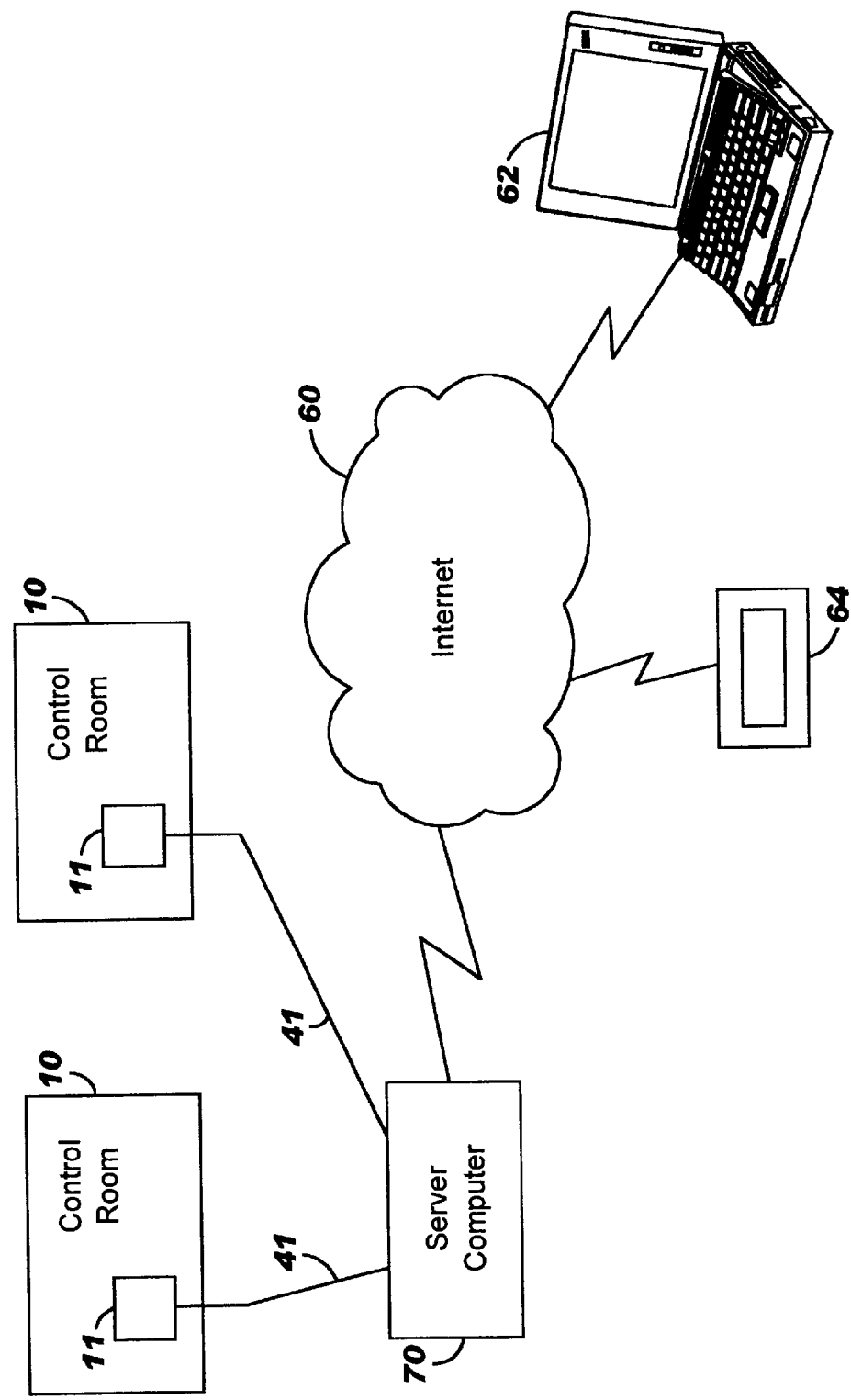
FIG. 2 shows a schematic showing the relationship between prior art process gas information systems and a centralized server according to the present invention, which is connected to client devices through the Internet.

FIG. 2 illustrates a preferred embodiment of the present invention. In accordance with the present invention, a server computer system 70 collects data containing information about the gas delivery systems from one or more process control rooms 10. The data includes information currently provided by the existing commercial gas delivery system but is not limited to such data. For example, in the preferred embodiment, during the repair, installation, or maintenance of a piece of equipment within the gas delivery system, a technician will record information about the service event including the date and time of the service event, as well as the amount of time it took to complete the service. In accordance with the present invention, this service information will also be recorded within the PC 11.

The data is communicated to the server computer system 70 from each PC 11 through a communications link 41, which could be a dedicated line or a telecommunications link such as provided by a telephone line and a modem as known in the art. In the preferred embodiment, this communications link is a local area network (LAN). The server computer system 70 includes program instructions that collect and organize the data in a database management system, such as DB2® (DB2® is a trademark of International Business Machines Corporation). This embodiment of the present invention also includes program instructions that allows an authorized engineer or technician to monitor, from a client computer system 62 preferably connected to the Internet 60, the status or to obtain statistics related to any combination of gas delivery systems within the enterprise without having to be physically present in a given control room 10. This embodiment also includes program instructions that monitor the information stored in the server computer system 70 for alarm events or other conditions requiring immediate attention and thereupon notify appropriate personnel, for example, by sending a message to a notification device 64. Such a device could be a pager, a cellular device, a Personal Digital Assistant (PDA), or any similar device. The appropriate personnel to notify would preferably be selected from a list of people qualified and on call to handle the alarm condition. Such an alarm condition could be alarms currently generated by the existing gas delivery system, or based on predetermined criteria designated by a user of the present invention.

Figure 3:
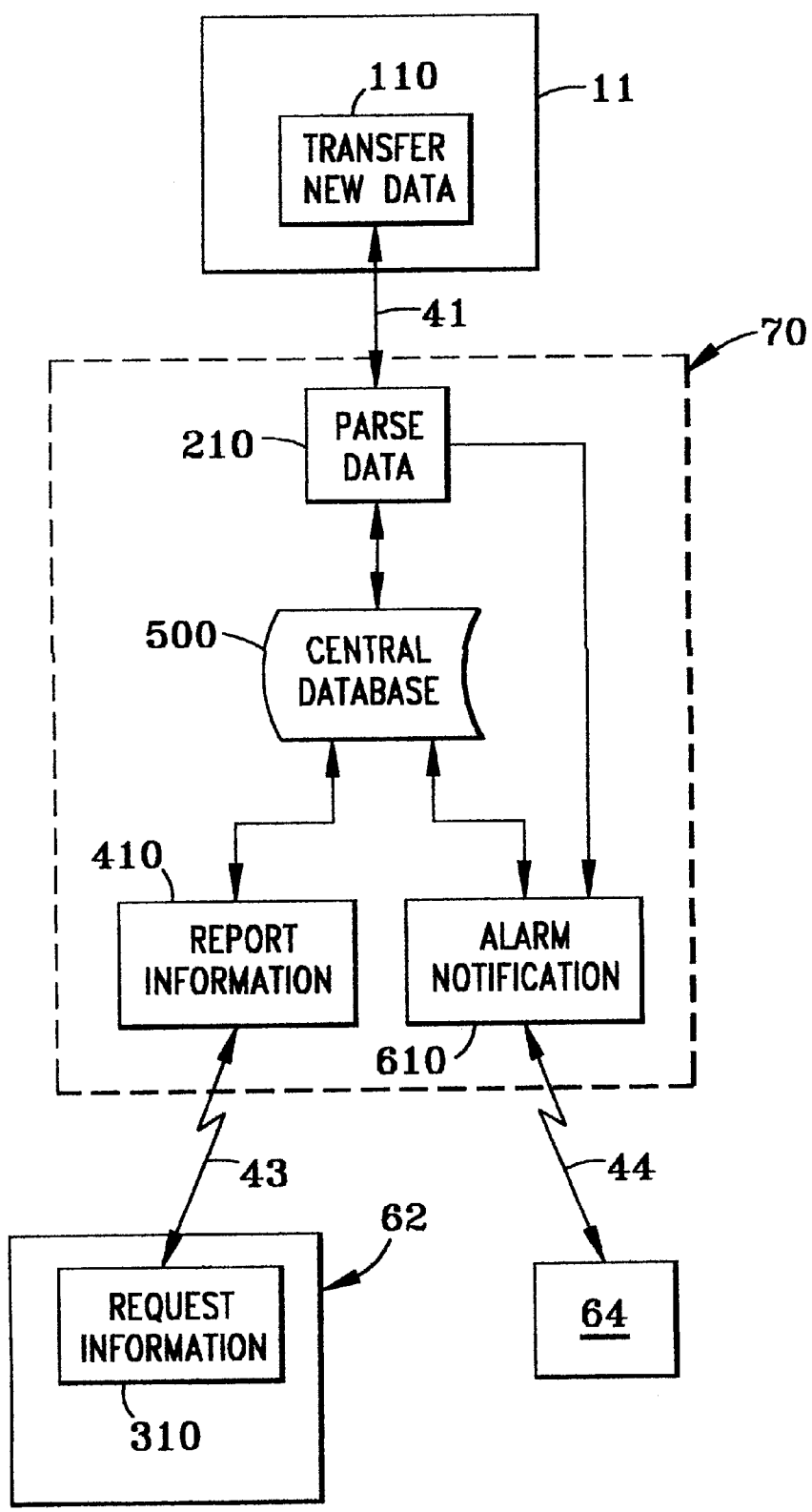
FIG. 3 is a diagram illustrating the components of a preferred embodiment of the present invention.

The key components of a preferred embodiment according to the present invention are illustrated in FIG. 3. An essential feature of the system is a central gas information database 500 that contains historical data collected from one or more control room PC's 11. The gas information database 500 resides on a computer storage medium that is part of a server computer system 70, and may be created using any standard database management system (DBMS). Two examples of commercially available DBMS's are DB2® from International Business Machines and Oracle® from Oracle Corporation, but any suitable method of creating and updating a database may be used.

The data includes information pertinent to the gas delivery systems as currently provided by existing systems, but may also include other information such as repair and maintenance information as discussed above. For example, data collected and stored into a PC 11 by the GASGUARD® system includes information such as 1) gas pressure to a tool, 2) liquid gas scale (weight) readings, and 3) gas cabinet or manifold events and alarms. Additional information entered by technicians in the preferred embodiment of the present invention include 4) cylinder changes, 5) recent installs, 6) time of failure, and 7) time of repairs. The present invention is not limited to this information, and one skilled in the art would recognize that a wide variety of information may be included and stored on a PC 11. According to the present invention, a transfer program 110 runs on each PC 11 within the control room 10 such that data stored the PC 11 is transferred over a communication link 41 to the server computer system 70. The data that is transmitted by the transfer program 110 is received by a parser program 210. The parser program 210 will interpret the data it receives, and update records in the central database 500, or create new records or a new database if appropriate.

The server computer system 70 further includes two additional programs according to the present invention. A receive requests program 410 waits for a request issued from a client computer system 62 when an engineer or technician desires to obtain status or generate a report based on information stored in the database 500 regarding the gases at the various manufacturing sites. In addition, a monitor program 610 monitors the database 500 for warnings or events that might require special attention by appropriate personnel, such as an alarm indicating failure of a tool, a depleted gas cylinder, or leakage of gases. If the monitor program 610 detects a significant event, then, in accordance with the present invention, the monitor program 610 will notify the appropriate personnel using a standard communications mechanism 44, for example, sending a message to a paging device 64, or other notification device. Since the transfer program 110, the parser program 210, and the monitor program 610 may all be configured to execute in an automated fashion (without requiring human intervention) in accordance with the present invention, the requirement for having on-site personnel within the control room 10 may be reduced. In addition, because historical data from all sites are now centralized in one database 500, additional statistical information may be generated to provide information that can be used to improve maintenance procedures and reduce failures in the future. For example, according to the present invention, statistics may be generated and reported by the receive requests program 410 to provide information regarding the mean time to failure of tools, gas cylinders, or other components in the gas delivery system, as well as information regarding maintenance schedules. A preferred embodiment of each component of the present invention is described in more detail below.

FIG. 4 illustrates a preferred embodiment of a data transfer program 110. Data from the gas delivery system resides on a local storage medium of the PC 11, typically a standard hard disk drive. For example, the GASGUARD® system writes two files. A first file is written that contains gas pressure data at a given time. If, for example, a user specifies that the pressure data is to be sampled every six hours, on the hour, then the GASGUARD® system will collect pressure data from each gas cabinet and manifold and store the data in a file that is named by the year, month, day, hour, and minute that the file was written according to the format "YYMMDDHHMM.DTA". Thus, a file created at 2:00 pm on Monday, Jul. 10, 2000, might have a file name of "0007101400.DTA", where the file type is "DTA". Similarly, a second file is written that contains event or alarm data having a file type of "EVT". In addition to the file types of "DTA" and "EVT" that are provided by the GASGUARD® system, the preferred embodiment also includes at least a third file that contains information about maintenance events. This information is entered into PC 11 by a technician performing the maintenance or repair, indicating information such as the date and time of the event and the length of time required to perform the maintenance. The entry of that information by the technician causes a file to be created with a file name comprising the date and time in a format similar to the "DTA" and "EVT" file types mentioned above, and having an appropriate file type name, such as "SVC" in one possible embodiment. It would be obvious to one skilled in the art that the number and type of data created is not limited by those described, but may include other types of data. In addition, it is not necessary that the data first be stored to disk first. However, for ease of implementation, the preferred embodiment uses files stored on a hard disk within PC 11. A set of program instructions 110 is created to perform the function of transferring the data from each PC 11 to a central server 70. In the preferred embodiment, the transfer program 110 is created to run as a background process using a number of methods known to those skilled in the art. Alternatively, transfer program 110 could also be designed to run at predetermined or scheduled times.

FIG. 4 illustrates the key functions performed by a transfer program 110 according to the present invention. The wake-up function (Block 112) is activated at a scheduled time in order to check for the existence of any new data files, or it may be activated, for example, by a signal indicating a red alarm forming from the gas delivery system. The data set forming function (Block 114) then looks for the existence of new data and prepares the data to be sent to the server 70 by formatting the data and including system identification information with the new data so that the server system 70 can uniquely distinguish data originating from each PC 11. In a preferred embodiment, this is accomplished by creating a new file name that includes the PC 11 system id information along with the time stamp information, although many other methods of providing unique identification information may be used. Next, the transfer function (Block 116) communicates the data to the server system 70 using a standard communications protocol. In a preferred embodiment, the transfer function (Block 116) notifies a parser program 210 on the server system 70 that PC 11 is preparing to send data to the server system 70, and upon acknowledgment from the server system 70, the transfer function (Block 116) then begins the transmission. The transmission may be accomplished using any of a number of methods known to those skilled in the art. For example, a commonly used data transfer method is known as FTP (File Transfer Protocol). The transmission link 41 is preferably a LAN, but could be any communications link that is known by those skilled in the art, such as a Wide-area network (WAN) or a dial-up modem. After the transfer function (Block 116) receives acknowledgment of successful data transfer from the server 70, the program enters a return function (Block 118), which returns the program to a sleep mode, and waits for the next scheduled event or the next alarm event.

FIG. 5 illustrates a flow diagram for an embodiment of a parser program 210 according to the present invention, which resides on the central server system 70 in order to accept data from a PC 11 from a control room 10, and enter the data into a central database 500 which also resides on the central server 70. The central database 500 is defined and created by a user using any suitable DBMS, preferably a Relational Database Management System (RDBMS) to contain selected gas information provided by the gas delivery system as well as maintenance information entered by technicians. Parser program initialization (Block 212) checks for incoming data by a method known to those skilled in the art, such as polling. Preferably, the parser program initialization (Block 212) is signaled by the transfer program 110 that new data is ready to be sent, particularly in the case that an alarm event or other critical condition is detected by the transfer program 110 on a PC 11, so that the alarm or critical condition may be handled immediately rather than wait for the next scheduled activity After determining (Block 214) which PC 11 the data will be coming from, communication is established with the transfer program 110 and data is transferred (Block 216). As the data is received, at least one record of the data is parsed and processed (Block 218) to determine where in the database 500 the information should be stored. Then the new information is written to the database 500 (Block 220). In addition, if a critical condition is detected (Block 219) as determined by a predefined criteria, then a signal is sent to another server program 610, to be described further below, which will notify appropriate person that an alarm condition has occurred. If more data is to be received from the same PC, then continue to receive additional data from PC 11 (Block 216); otherwise, await communications (Block 212) from another PC 11 (Block 222).

To summarize then, a first aspect of the present invention is the creation and maintenance of a central database 500 located on a central server 70. According to a preferred embodiment of the invention, a set of program instructions embodied, for example, as parser program 210, runs on the central server 70 in order to collect information about the gas delivery systems sent by a transfer program 110 from each of the PC's 11 in each of the control rooms 10. The parser program 210 also updates the centralized database 500 with the latest information received.

Once the central database 500 is created or updated, two further aspects of the present invention is to provide for information to be communicated to appropriate personnel. The first aspect according to the present invention allows a user using a remote client computer system 62 to request information from the database 500. The second aspect according to the present invention provides for automatic communication to appropriate personnel about conditions that require immediate attention.

FIG. 3 illustrates an embodiment of the present invention by which a user using a client computer system 62 from a remote location may request information from the central database 500. In a preferred embodiment, the user accesses a Web page on the central server 70 using a Java™-enabled Web browser (not shown) communicating with report generation program instructions 410 on the central server 70 through the Internet using preferably secure World Wide Web services. Program instructions for requesting information 310 are executed on the client computer system 62. In the preferred embodiment, the request information program 310 is a Java™ applet that is downloaded from the central server 70 when the user selects the report generation function from the central server Web page.

Figure 6:
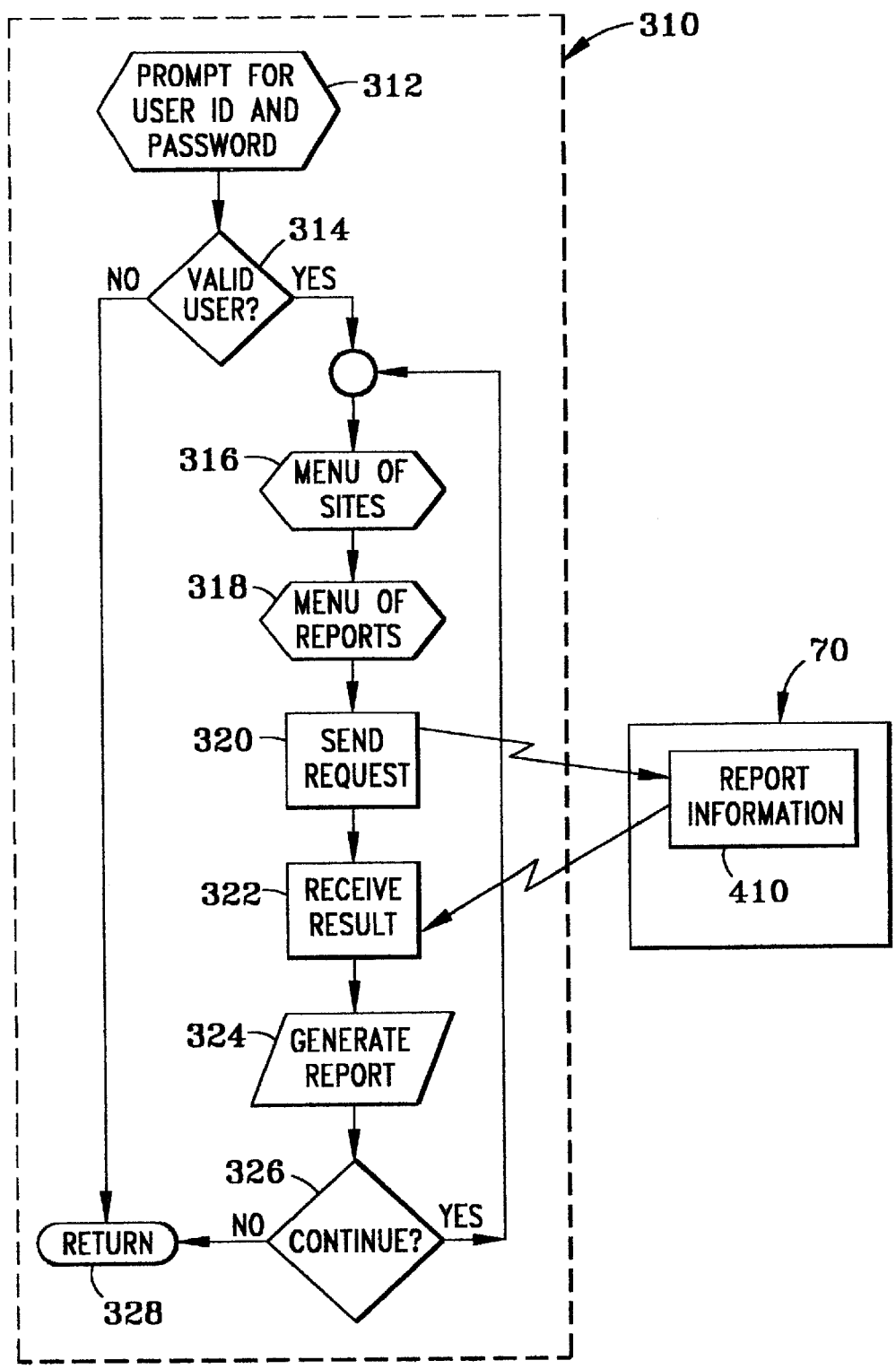
FIG. 6 shows a flow chart of a request program that presents a user with a menu of choices from which the user on the Internet may request information from the database on the server.

FIG. 6 illustrates a flow diagram of a preferred Java™ applet embodiment for request program 310. The user is prompted for user id and password and the authorization of the user to access the server and to access the database is validated (Block 312). If the user is authorized to access the server and database (Block 314), then a menu is presented that displays a list of sites for which the user is authorized to obtain information about (Block 316). If the user enters an invalid user id or password, the program will prompt the user to re-enter the user id or password, or exit if appropriate (Block 328). After the user selects one or more sites, and then the user selects the type of information to be requested, as well as the reporting format (Block 318). For example, a technician may wish to monitor the status of flow rates and pressure readings to ensure that the operation of the gas delivery system is normal, and to determine whether there are any alarms present. Alternatively, a manager may wish to obtain a report on the repair statistics, and obtain a prediction about mean time to failure for any set of equipment, and percent of down time required due to any particular service event in order to improve planning and predict potential problem areas. Additional levels of security may be provided to validate each type of data to be accessed by a given user. The query is sent to the report generation program 410 on the central server 70 and the request program 310 waits for the report generation program 410 to send a report back from the central server 70 (Block 322). When the results of the query are received (Block 322), then the results may be formatted and displayed on the screen which may be printed, or alternatively be formatted as a file to be downloaded for later viewing and printing (Block 324), for example, by means of a plug in program. A plug-in is a computer program that extends the capabilities of a browser, as known to those skilled in the art. Finally, the user is provided with the option to request additional information (Block 326) or to return (Block 328).

Figure 7:
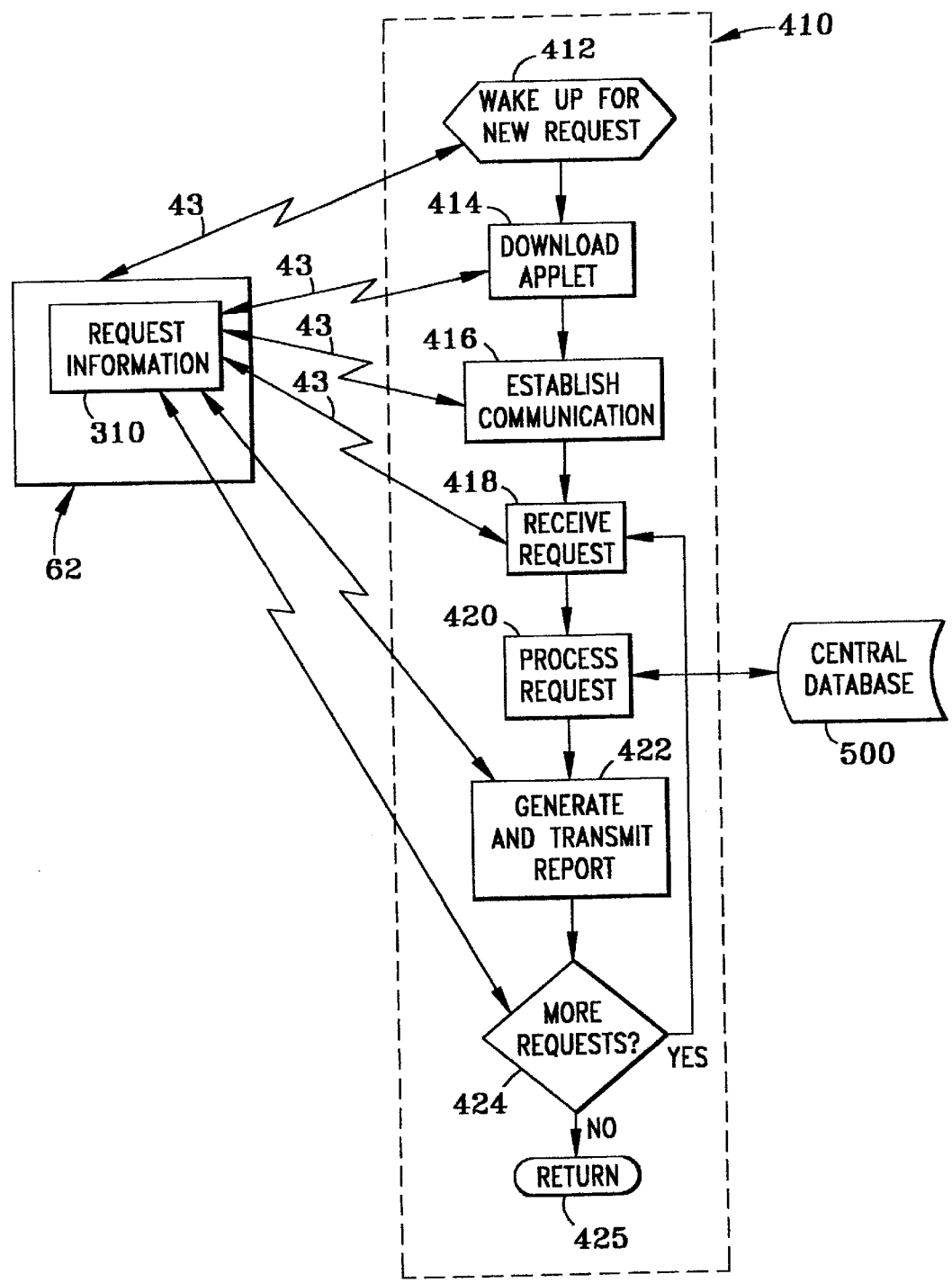
FIG. 7 shows a flow chart of a reporting program running on the server computer system that receives requests from the request program, performs the database commands issued by the request program, generates reports and communicates the results to the request program for presentation to the user.

FIG. 7 illustrates the operation of the report generation program 410, according to this embodiment, that runs on the server computer system 70. The report generation program 410 is initiated or woken up (Block 412) by a request from client computer 62 that is preferably running a Java™-enabled Web browser (not shown). In the preferred embodiment, a Java™ applet is then downloaded (Block 414) from the central server 70 to the client computer system 62, and then executes within the Java™ Virtual Machine on the client computer system 62. A secure connection is established between the Java™ request applet 310 and the report generation program 410 and user authentication is performed (Block 416). User authentication may include not only access to the server computer system 70, but also for a selected set of sites, and for a selected type of data, or other combinations of restricted access. Assuming that the user is authorized, the report generation program 410 then waits for and then receives a request for information from the request program 310 (Block 418). An appropriate request is then issued to the database management system to obtain the requested information from the central database 500 (Block 420). The information obtained from the database 500 is then appropriately formatted according to the desires of the user, and then sent to the client computer system 62 (Block 422). If more requests are desired (Block 424), the program waits for additional requests (Block 418) or else returns (Block 426).

Figure 8:
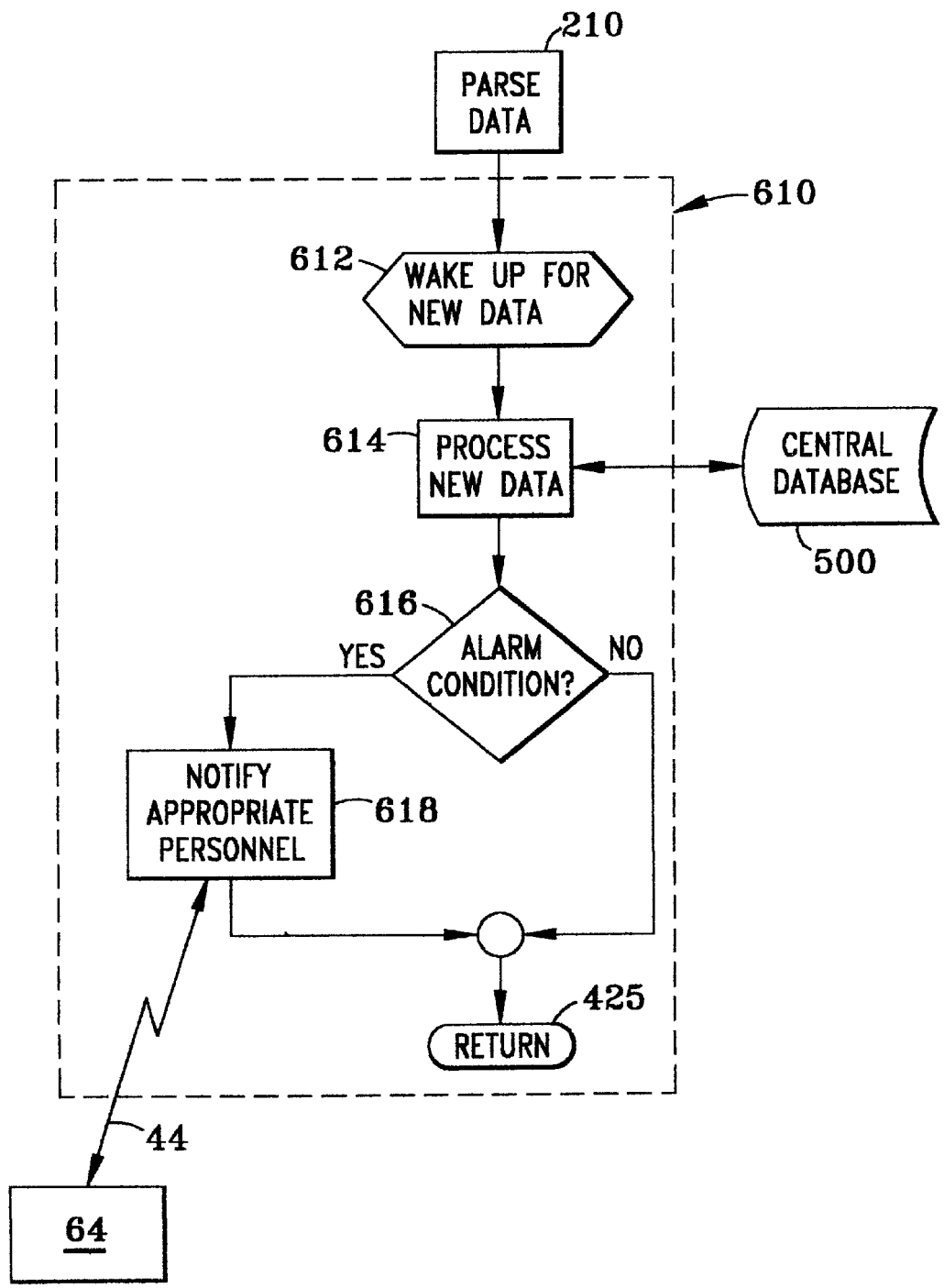
FIG. 8 shows a flow chart of a notification program that monitors the incoming data on the server computer system and notifies selected personnel when critical conditions are detected.

Thus, the present invention permits a technician or manager to more effectively and efficiently monitor the status of process gas facilities that they have responsibility for anywhere in the world without having to physically be present in the control rooms 10 unless absolutely necessary for maintenance or repair activities. In addition, with the additional statistical information made available according to the present invention regarding failure and repair statistics, it becomes possible to evaluate and compare various systems comprising. different control rooms, buildings, or sites, and identify high failure rates and problematic equipment. This in turn permits improvements in planning maintenance to minimize future failures and minimize the length of outages Another aspect of the present invention provides for the relatively infrequent circumstance that requires immediate attention due to the occurrence of a critical condition. This aspect of the invention provides for automatic notification of alarms provided by the gas delivery system 50 or any condition that requires immediate attention, such as leaks, low pressure conditions that may indicate a nearly empty cylinder, or a piece of equipment that is nearing its mean-time-to-failure. In the preferred embodiment, the parser program 210 compares data from the gas delivery system to predefined criteria to determine whether a critical conditions exists, and sets an alarm if the predetermined criterion is met. In a typical operation, a technician is not on site or in the control room twenty-four hours a day. Thus, the present invention includes instructions for a notification program 610 that runs on the central server computer 70. FIG. 8 illustrates a block diagram for a preferred embodiment of a notification program 610. The notification program 610 is preferably a background process that waits for a signal from the parser program 210. A signal received from the parser program 210 indicates that a critical condition or alarm has been received from one of the control room PC's 11 and the notification program wakes up immediately (Block 612). The alarm information is read (Block 614), preferably directly from information sent by the parser program 210, or alternatively from the central database 500. In addition, the notification program 610 may wake up on a scheduled basis to read the current data from the central database 500. The data is evaluated for severity (Block 616), and if the condition is sufficiently severe, a person is selected from a list of appropriate personnel to be notified (Block 618). For example, a message may be sent to a notification device such as pager 64 or any similar device using methods known to those skilled in the art. The person who is so notified may then use a client computer system 62 to obtain more detailed: information about the problem by using the request function 310 of the present invention, and then take appropriate action. For example, the information provided by the request program 310 may provide a technician with specific information regarding the equipment and parts required and permit a more effective response to correct the critical condition.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

We claim:

1. A monitoring system for accessing information regarding a process gas delivery system at a location remote from the process gas delivery system and for delivering selected information to a client computer system, the monitoring system comprising:

a first computer readable storage medium connected to a local computer system including at least one input device and having stored therein new data including process gas delivery system information including new maintenance and repair information for pieces of equipment of the gas delivery system, said new data entered via said at least one input device into the local computer system, said first computer readable storage medium having stored therein first instructions for causing the local computer system to form a data set comprising said new data and identification information uniquely identifying an origination location of said new data;

a server computer system connected to the local computer system by a computer network;

a second computer readable storage medium connected to said server computer system and having stored therein a database including historical process gas delivery system information and historical maintenance and repair information, said second computer readable storage medium having stored therein second instructions for causing said server computer system to parse said new data from said data set and store said new data into said database, and for computing said maintenance and repair statistics derived from said new and historical maintenance and repair information including a mean-time-to-failure of the piece of equipment;

means for transferring said data set from the local computer system to said server computer system;

means for receiving a request from the client computer system for selected information based on the information stored in said database; and means for processing said request and transferring said selected information from said server computer system to the client computer system.

2. The monitoring system of claim 1, wherein the computer network includes a connection to the Internet, and said, request is received using said connection.

3. The monitoring system of claim 1 further comprising:

a means for validating that a user of the client computer system has authority to access said server computer system;

a means for providing a secure connection between the client computer system and said server computer system;

a means for validating that the user has authority to access said database; and a means for validating that the user has authority to access the information stored in said database.

4. The monitoring system of claim 3, wherein the computer network includes a connection to the Internet, and said request is received using said connection.

5. The monitoring system of claim 1 wherein said second instructions further comprise instructions for causing said server computer to generate mean-time-to-failure alarm information when one of said pieces of equipment nears its mean-time-to-failure and identify a selected person having a notification device and transmit said mean-time-to-failure alarm information to the notification device.

6. The monitoring system of claim 1 wherein said second instructions further comprises instructions for causing said server computer to process said new data, compare said processed data to predetermined criteria related to the mean-time-to-failure of a piece of equipment and, if said data meets said predetermined criteria, generate mean-time-to-failure alarm information indicating occurrence of a mean-time-to-failure alarm condition, identify a selected person having a notification device, and transmit said mean-time-to-failure alarm information to the notification device.

7. A method for accessing information regarding a process gas delivery system at a location remote from the process gas delivery system and for delivering selected information to a client computer system, the method comprising the steps of:

providing a first computer readable storage medium connected to a local computer system, said first storage medium having stored therein new data including process gas delivery system information, new maintenance information and new repair information;

forming a data set comprising said new data and identification information uniquely identifying an origination location of said new data;

connecting a server computer system to the local computer system by a computer network;

providing a second computer readable storage medium connected to said server computer system and having stored therein a database including historical process gas delivery system information, historical maintenance information and historical repair information;

computing maintenance and repair statistics derived from said new and historical maintenance and repair information, including a mean-time-to-failure for pieces of equipment of the gas delivery system;

parsing said new data from said data set;

storing said new data into said database;

transferring said data set from the local computer system to said server computer system;

receiving a request from the client computer system for selected information based on the information stored in said database;

processing said request;

transferring said selected information from said server computer system to the client computer system.

8. The method of claim 7, wherein the computer network includes a connection to the Internet, and said step of receiving a request uses said connection to the Internet.

9. The method of claim 7 further comprising:

validating that a user of the client computer system has authority to access said server computer system;

providing a secure connection between the client computer system and said server computer system;

validating that the user has authority to access said database; and validating that the user has authority to access the information stored in said database.

10. The method of claim 9, wherein the computer network includes a connection to the Internet, and said step of receiving a request uses said connection to the Internet.

11. The method of claim 7, further comprising, after said step of parsing, generating mean-time-to-failure alarm information when one of said pieces of equipment of said gas delivery system nears its mean-time-to-failure; and identifying a selected person having a notification device and transmitting said mean-time-to-failure alarm information to the notification device.

12. The method of claim 7 wherein said step of parsing further comprises processing said new data, comparing said processed data to predetermined criteria related to the mean-time-to-failure of said one of said pieces of equipment of the gas delivery system and, if said data meets said predetermined criteria, generating mean-time-to-failure alarm information indicating occurrence of a mean-time-to-failure alarm condition, identifying a selected person having a notification device, and transmitting said mean-time-to-failure alarm information to the notification device.

\* \* \* \* \*